March 30, 1943.  E. L. WIEGAND  2,315,031
VALVE MEANS
Original Filed Dec. 7, 1939
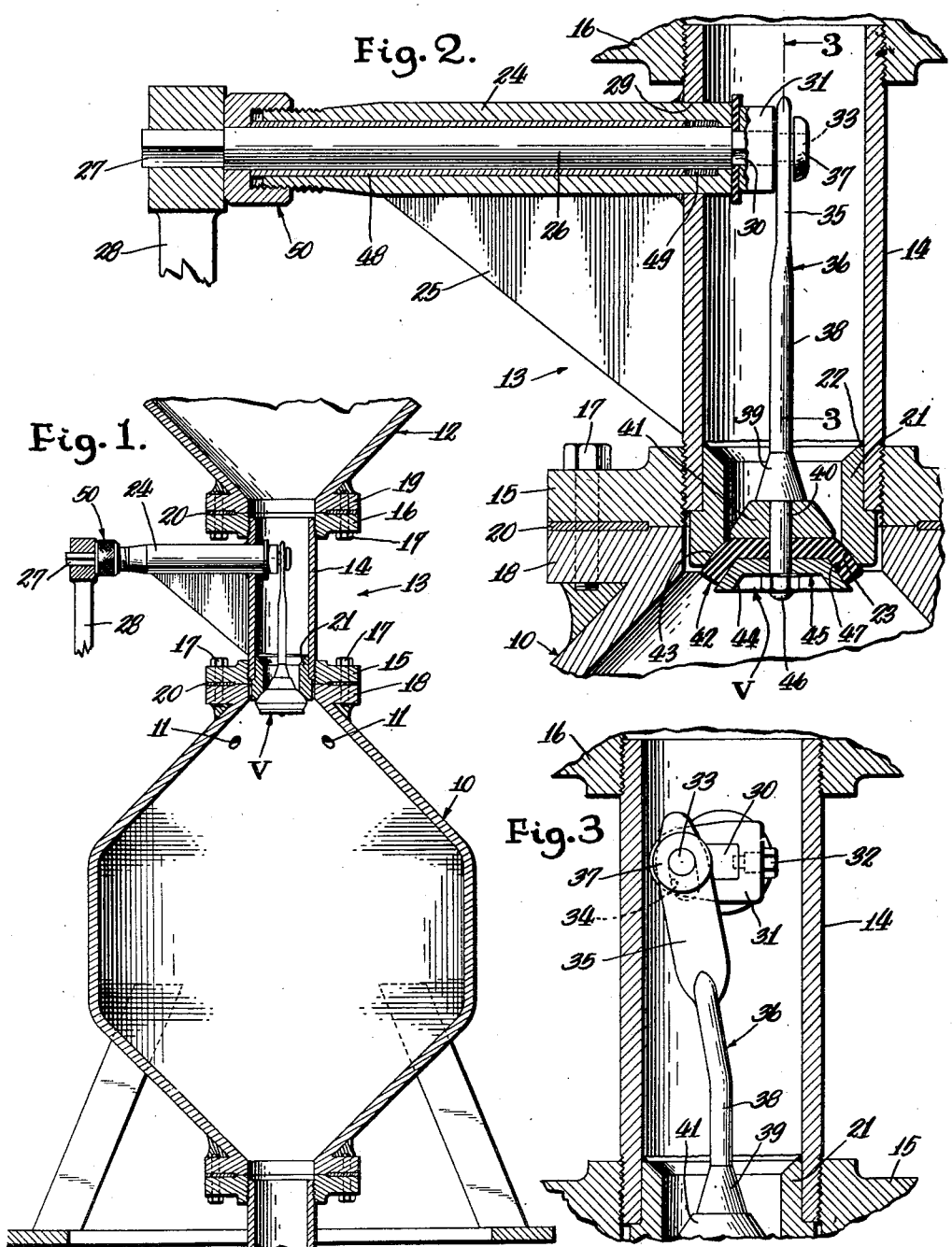
Edwin L. Wiegand
INVENTOR
BY Freeman, Sweet and Albrecht
ATTORNEYS Patented Mar. 30, 1943

2,315,031

UNITED STATES PATENT OFFICE 2,315,031

VALVE MEANS

Edwin L. Wiegand, Pittsburgh, Pa.

Original application December 7, 1939, Serial No. 308,002. Divided and this application November 2, 1940, Serial No. 364,073

6 Claims. (Cl. 251—41)

My invention relates to valve means, and is particularly adapted for use in connection with the handling of materials of a divided nature, or in the handling of materials under high pressure, or both. The principal object of the invention is the improvement of valve means of these types. This application is a division of my application Serial Number 308,002, filed December 7, 1939.

In the drawing accompanying this specification and forming a part of this application, there is shown, for purposes of illustration, one embodiment of my invention, and in this drawing:

Figure 1 is a vertical cross-sectional view, partly fragmentary, of apparatus embodying my invention, Figure 2 is an enlarged cross-sectional view of a portion of Figure 1, and Figure 3 is a fragmentary cross-sectional view taken on the line 3—3 of Figure 2.

Figure 1 shows a lower tank 10 which in this embodiment is designed to withstand very high fluid pressure, for example, compressed air at a pressure of the order of 500 to 1500 pounds per square inch or more. Admission of compressed air may be through openings 11. Figure 1 also shows an upper tank 12, fragmentarily, and this tank is similar to the lower tank 10. Interposed between the tanks 10, 12, is valve means 13 comprising a connecting tube 14, flanges 15, 16, having threaded apertures being screwed onto the threaded ends of the tube 14, and the flanges 15, 16 being fastened by bolts 17 to flanges 18, 19 respectively provided on the tanks 10, 12. Gaskets 20 may be interposed between the flanges 15, 18, and the flanges 16, 19.

A bushing 21 constituting a valve-seat block is fitted into the lower end of the tube 14, and desirably is welded to the tube, as shown at 22 (Figure 2). The bushing 21 is here shown as extending partially into the upper open end of the lower tank 10. The lower end of the bore of the bushing 21 is margined by a bevel surface 23 which may be approximately frustro-conical and may be slightly arcuately dished as shown.

Extending transversely from the tube 14 is a bearing supporting means comprising a bearing tube 24, a web 25 reinforcing the connection between the bearing tube 24 and the tube 14, the web being suitably fastened to these tubes. Journaled within the bearing tube 24 is a valve operating shaft 26 having a squared outer end 27 for receiving one end of a valve lever 28. The bearing tube 24 is desirably welded to the tube 14 where it passes through an aperture 29 in the tube 14. The bearing tube 24 extends a slight distance within the tube 14, and the operating shaft 26 at this point is reduced in diameter and has a squared end 30 to fit into a square opening formed in a crank 31, a set screw 32 holding the crank 31 to the shaft The crank 31 carries an off-center pin 33 fitting through a slot 34 formed in a flattened portion 35 of a rod 36, the pin 33 having a headed portion 37 holding the rod 36 assembled on the pin 33. The rod 36 also has a portion 38 round in cross-section and slightly bent, as best shown in Figure 3, and the lower end of the rod 36 is formed with a conical enlarged portion 39, and with a reduced extremity 40 (Figure 2) forming a shoulder with the conical portion 39. A frustro-conical block 41 having a central aperture, is fitted on the reduced extremity 40, and a resilient valve member 42, preferably formed of rubber and having generally frustro-conical opposite surfaces 43, 44, is fitted over the reduced extremity 40. The block 41 is of a size which will fit freely within the bore of the bushing 21. An inverted cup-shaped disk 45 is positioned to hold the valve member 42 in position, a nut 46 being screw-threaded on the end of the reduced extremity 40 to hold the disk 45, the valve member 42, and the block 41, in position on the valve rod 36, the nut 46 preferably being welded to the disk 45 as shown in Figure 2. The cup-shaped disk 45 has an approximately frustro-conical surface 47 engaging the surface 44 of the valve member 42. The parts 41, 42, and 45 are herein collectively termed the valve body V.

The valve body is shown in closed position in the figures, the surface 47 of the cup-shaped disk pressing against the surface 44 of the valve member 42 thereby in turn pressing the surface 43 against the valve seat 23. Sufficient rotation of the shaft 26 in a direction to cause counter-clockwise movement of the crank 31, with reference to its position shown in Figure 3, will cause unseating of the valve member 42 from the valve seat 23. The slot 34 permits the pin 33 to give a hammer blow to the lower end of the slot in opening the valve.

The slot 34 also permits the valve member to be pressed more firmly against the seat 23 by fluid pressure within the tank 10. Accordingly, it will be evident that a large force is not required on the rod 36 to cause the valve member 42 to be pressed against the valve seat 23 sufficiently to hold a high pressure in the tank 10, the pressure in the tank 10 taking the place of such force. Furthermore, the construction of the valve body V is such that it will hold high pressures.

The bore of the bearing tube 24 may be enlarged so as to accommodate between it and the shaft 26 a tubular gland 48 which may be forced against packing 49 by a gland nut 50 threaded on the outer end of the bearing tube 24. The enlarged part of the bore of the tube 24 extends to near the inner end of the tube so that the packing 49 effectively prevents grit from getting between the journal surface of the shaft 26 and the cooperating bearing surface of the gland 48.

The embodiment herein illustrated is particularly adapted for use in a system for grinding materials, the materials being subjected to the action of air under pressure to move them at high velocity and cause them to be ground by impact. It will however be apparent that the present invention is not limited to such use. In the embodiment illustrated the material to be ground is first introduced into the tank 12 in any suitable way. Assuming that the system is in normal continuous operation, the valve body V is in closed position and there is high pressure within the tank 10 whereby material already in the tank 10 is forced out of the opening at the bottom of the tank 10 and to the grinding means. After introduction of material into the tank 12, the pressure within the tank 12 is brought up to the pressure within the tank 10 and the valve lever 28 is moved to move the valve body V to open position, whereby the material in the tank 12 is dumped into the tank 10. The valve lever 28 is then moved to move the valve body V to closed position. Thereafter the pressure within the tank 12 may be relieved so that it may receive another charge of material. The material to be ground may contain more or less finely divided material or grit which might enter between the journal surface of the shaft 26 and the bearing surface surrounding it, were it not for the construction and arrangement hereinbefore described. Such entry might take place even under atmospheric pressure but the tendency to such entry is greatly increased when the pressure within the tube 14 is high.

From the foregoing it will be apparent to those skilled in the art that the illustrated embodiment of my invention provides a new and improved valve means, and accordingly, accomplishes the principal object of my invention. On the other hand, it also will be obvious to those skilled in the art that the illustrated embodiment of my invention may be variously changed and modified, or features thereof, singly or collectively, embodied in other combinations than that illustrated, without departing from the spirit of my invention, or sacrificing all of the advantages thereof, and that accordingly, the disclosure herein is illustrative only, and my invention is not limited thereto.

I claim:

1. In combination: housing means; valve operating means disposed in said housing means; elongated support means carried by said housing means and extending through a wall of said housing means; an operating shaft, for said valve operating means, extending through said support means into said housing means and having a free inner end spaced from the inside wall of said housing; said support means having a counterbore, larger than said shaft, extending from the outer end of said support means to near its inner end and leaving an internal shoulder near said inner end; an elongated tubular member disposed within said counterbore and surrounding said shaft to serve as a bearing surface therefor; packing between the inner end of said tubular member and said shoulder; and means for forcing said tubular member against said packing.

2. In combination: housing means including a tube; a valve seat coaxial with said tube and carried by said tube at an end thereof; a valve body cooperable with said valve seat; an operating shaft; elongated support means carried by and extending through a wall of said tube, said support means having an opening through which said operating shaft extends into said tube; said support means having a counterbore, larger than said shaft, extending from the outer end of said support means to near its inner end and leaving an internal shoulder near said inner end; an elongated tubular member disposed within said counterbore and surrounding said shaft to serve as the sole bearing surface therefor; packing between the inner end of said tubular member and said shoulder; means for forcing said tubular member against said packing; and means within said tube, connecting said shaft and said valve body, so constructed and arranged that by rotation of said shaft said valve body may be caused to move toward or away from said valve seat.

3. In combination: housing means; valve operating means disposed in said housing means; elongated support means carried by said housing means and extending through a wall of said housing means; an operating shaft, for said valve operating means, extending through said support means into said housing means and having a free inner end spaced from the inside wall of said housing; said support means having a counterbore, larger than said shaft, extending from the outer end of said support means to near its inner end and leaving an internal shoulder near said inner end; an elongated tubular member disposed within said counterbore and surrounding said shaft to serve as a bearing surface therefor approximately coextensive with said counterbore leaving a space between the inner end of said tubular member and said shoulder which is small relatively to the axial length of said bearing surface; packing in said space; and means for forcing said tubular member against said packing.

4. In combination: a pressure tank adapted to receive fluid under pressure; said tank having an inlet through which material may be introduced; a valve for controlling said inlet, said valve including a valve body cooperable with a valve seat; valve actuating means, including an operating member having a lost motion connection with said valve body, so constructed and arranged that when said operating member has moved said valve body against said seat said lost motion connection is adapted to permit fluid under pressure in said tank to force said valve body against said seat and when said operating member is moved toward valve-opening position said member is adapted to take up lost motion in said connection to unseat said valve body with a hammer blow.

5. In combination: a pressure tank adapted to receive fluid under pressure; said tank having an inlet through which material may be introduced; a valve for controlling said inlet, said valve including a valve body cooperable with a valve seat; valve actuating means, including a crank having a lost motion connection with said valve body, so constructed and arranged that when said crank has moved to a position generally cross-wise of the axis of said valve seat to move said valve body upwardly against said seat said lost motion connection is adapted to permit fluid under pressure in said tank to force said valve body upwardly against said seat and when said crank is moved toward valve-opening position, lost motion in said connection is taken up to unseat said valve body with a hammer blow.

6. In combination: a tube; a valve seat coaxial with said tube and carried by said tube at an end thereof; a valve body cooperable with said valve seat; an operating shaft; support means carried by and extending through a wall of said tube, said support means having an opening, at its end within said tube, through which said operating shaft fits rotatably and extends into said tube; and means within said tube, including lost motion connecting means between said shaft and said valve body, so constructed and arranged that by rotation of said shaft said valve body may be caused to move toward or away from said valve seat; said lost motion connecting means comprising a crank and means for fastening said crank to said shaft, a pin on said crank, a connecting rod connecting said valve body and said pin, said connecting rod having a longitudinally extending slot in which said pin is disposed, and means for maintaining said connecting rod in operative relation to said pin in all operative positions of said crank.

EDWIN L. WIEGAND.